United States Patent [19]
Cooper

[11] Patent Number: 6,164,445
[45] Date of Patent: *Dec. 26, 2000

[54] DECORATIVE COMPACT DISC DISPLAY DEVICE

[76] Inventor: Gregory S. Cooper, 204B Glen Andrews Dr., Pittsburgh, Pa. 15116

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,942

[22] Filed: Jun. 13, 1997

[51] Int. Cl.[7] .................................................. B65D 85/57
[52] U.S. Cl. ........................ 206/308.1; 206/493; 211/40
[58] Field of Search .................. 206/308.1, 309–313, 206/493, 459.5; 211/40, 41.12; 40/340; 248/127, 158, 176.1; D6/310, 469

[56] References Cited

U.S. PATENT DOCUMENTS

| | | | |
|---|---|---|---|
| 2,773,727 | 12/1956 | Bradley | 211/40 |
| 4,729,479 | 3/1988 | Wallin | 211/40 |
| 5,160,049 | 11/1992 | McMillen, Jr. | D6/310 |
| 5,263,580 | 11/1993 | Ciba et al. | 206/310 |
| 5,533,614 | 7/1996 | Walker | 206/308.1 |
| 5,570,791 | 11/1996 | Sommi | 211/40 |
| 5,573,120 | 11/1996 | Kaufman et al. | 206/308.1 |
| 5,595,293 | 1/1997 | Miller | 206/459.5 |
| 5,713,462 | 2/1998 | Hansen | 206/312 |

*Primary Examiner*—Paul T. Sewell
*Assistant Examiner*—Luan K. Bui

[57] ABSTRACT

A compact disc display device having a display member, and a base member. Said display member forms upwardly adjacent from said base member where the base member rests on any horizontal surface. A compact disc securing means is attached to the display member that releasably secures to a center hole in the compact disc.

4 Claims, 10 Drawing Sheets

FIG. 9
FIG. 10
FIG. 11
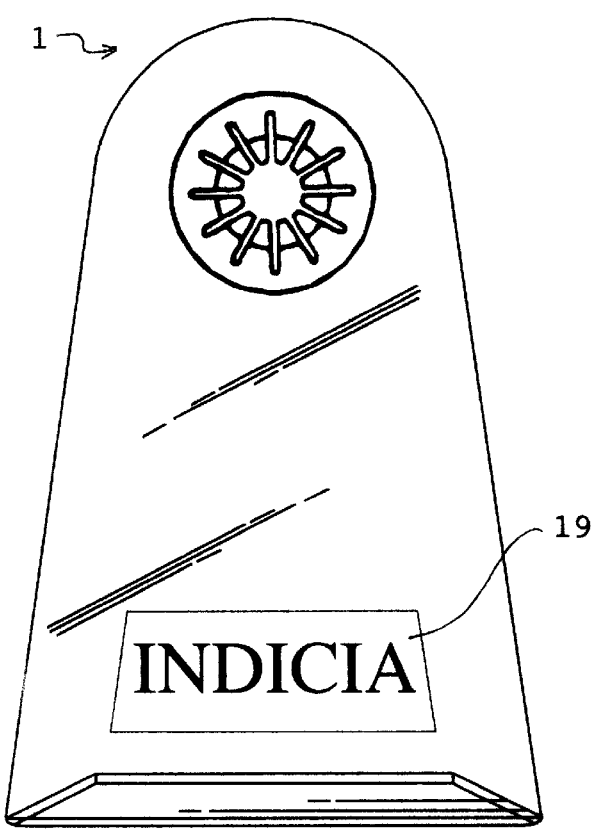
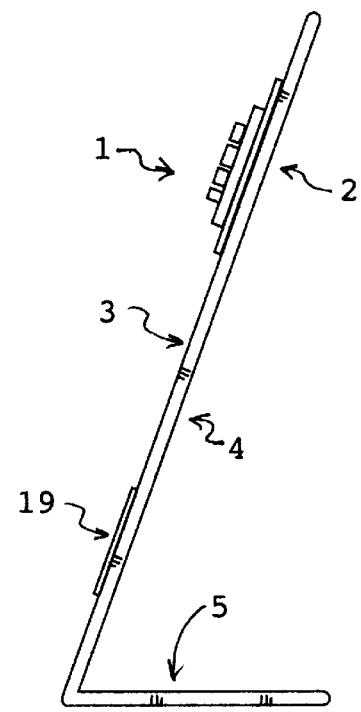
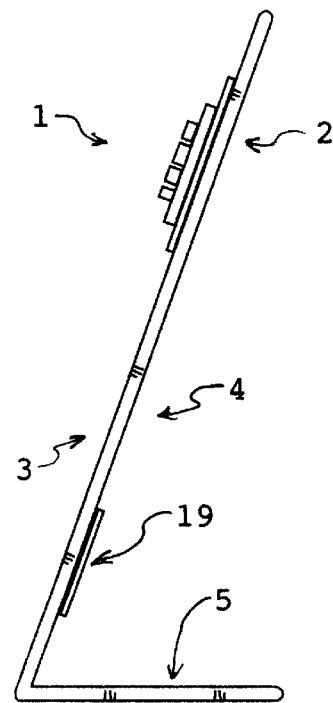

DECORATIVE COMPACT DISC DISPLAY DEVICE

FIELD OF THE INVENTION

This invention relates to storage devices useful for decoratively displaying compact optical discs.

BACKGROUND OF THE INVENTION

Over the past ten years, compact discs have achieved significant status as a collectible, both for enjoyment and investment. Investment-grade compact discs now command hundreds and even thousands of dollars. In addition, the compact disc manufacturing art is creating graphical design innovations to the compact disc itself, increasing its decorative appeal. Multi-color silk screen, random dot, and off-set printing techniques allow compact discs to be decorated with highly detailed color pictures. Technologies like 3-D I.D™ holographic disc printing and Imagedi™ disc etching creates incredible hologram and refractive effects. More recent technologies like the shaped compact disc (i.e. a compact disc cut into a shape other than the traditional round) and the Cool Disc™ (i.e. a compact disc with only a partially metalized surface) create a unique, even spectacular presentation of the compact disc.

The term compact disc, as used herein, and in the claims, is broadly defined as any "optically readable media" encompassing any medium on which information may be optically read by a laser, including, but not limited to, data that represents audio, video, text, images, computer data, or any other combination thereof.

The typical compact disc is a polycarbonate, annular information carrier disc containing a concentric spiral of pits representing digital information that can be optically read with a low power laser. One planar surface of the disc is smooth (read-side of the disc) while the opposite planar surface of the disc has the concentric spiral of pits molded into it (print-side of the disc). A thin layer of reflective metal is evaporated onto the pitted surface of the disc. An acrylic-type coating layer is then deposited onto the metal surface of the disc encapsulating said metal surface. In practice, the disc is removably attached to a compact disc player spindle mechanism through a center hole in the compact disc. The spindle mechanism rotates the disc at high speed. A laser will then enter through the smooth surface of the disc (read-side), focus onto the pitted surface, and reflect the spiral of pits forming a data stream. The data stream is read by a diode sending the data to a digital-to-analog converter eventually creating music, video, or other desired information. The disc may be any size including the standard 4.7 inches diameter, or from the 3 inch diameter digital disc to the larger 8 or the 12 inch diameter laser disc. All references to the compact disc and related media will heretofore be called CD.

The CD also comprises an annular stacking ring near the center portion of the disc between the center hole and the digital information. The stacking ring is a non-critical surface portion of the disc designed to allow the disc to be handled, stacked one on top of another, or to be secured to devices like a jewel box or a CD player without damaging the information.

As with most collectibles, a major concern to collectors is how to display and showcase those collectibles in a decoratively pleasing manner. For CDs, there currently exists no utility whose purpose is to decoratively display the disc. There does exist several CD storage devices, all of which are used for either, storing the CD itself, storing the CD on a wall display, or storing the CD and displaying the same in bins at the music store or in the home. None of these, however, decoratively display the CD in any manner even remotely similar to that of the present invention. Most CDs are sold and stored in what the CD manufacturing art has termed a jewel box. The typical jewel box is a three piece molded plastic box comprising: a transparent base member, a transparent lid member hingedly attached to said base member, and a disc-holding tray member secured onto said base member. The disc is removably secured onto the tray member by a centrally located circular array of flexible teeth or bubble on the tray, generally referred to as a hub. The hub employs the required friction to the center hole edge of the compact disc allowing it to be removably secured into place. The jewel box is made of a clear resilient plastic material and is approximately 5 inches high by 5½ inches long and ³⁄₁₆ inch thick. The above description is for a single compact disc jewel box. Variations to this jewel box exists that can accommodate two or more compact discs. Moreover, there are many similar jewel box-type CD packages well known to the art such as the Digipak® U.S. Pat. No. 4,709,812 and the Qpak® U.S. Pat. No. 5,284,242. All of these packages are similar to the jewel box in that they are containers useful for basic storage and protection of the CD when they are bought, sold, and before and after use. The primary utility of these packages, however, is not to decoratively display the CD. Their purpose is as a pure protective storage device. Conversely, the utility of the present invention is to decoratively display the CD, its graphics, and its shape.

Various wall mounted units exist designed to display or store the CD already housed in its jewel box-type packaging. Such units like the "CD Master Linx" (Patent Pending) and the "CDisplay" CD storage unit U.S. Pat. No. 5,105,952 are designed to hold the jewel box only. These units generally attach to the wall displaying the face of the jewel box's lid in the closed position. The utility of the present invention is distinguished from these aforementioned designs because instead of displaying the lid of the jewel box only, the present invention decoratively displays the CD, its graphics, and its shape.

A myriad of jewel box storage cabinets are also common to the CD art. They, however, are strictly mass storage units and provide little or no decorative display characteristics to the CD. These storage units can hold anywhere from approximately five to five hundred jewel boxes in a limited amount of space. Because their focus is on pure mass storage of jewel boxed CDs in the smallest amount of space as possible, these storage cabinets are distinguishable from the present invention. As previously stated, the utility of the present invention is to decoratively display the CD its graphics, and its shape.

Other CD display units are designed to hold the jewel boxed CD and are configured to rest inside the storage bins at CD retailers. Storage units like U.S. Pat. No. 4,589,549 and U.S. Pat. No. 4,834,238 are examples of this type of embodiment. The packages, however, are not designed to decoratively display the CD on a counter-top-like surface, and only displays the front lid of the jewel box. They simply store the jewel box until the CD is sold where it is then removed. As previously stated, the utility of the present invention is to decoratively display the CD, its graphics, and its shape.

SUMMARY OF THE INVENTION

The object of the present invention is heretofore directed to a Compact Disc Display Device that will showcase and display the compact disc in a decorative manner.

It is a further object to provide a Compact Disc Display Device having a display member and a base member where said display member forms upwardly adjacent from said base member. The base member rests on a horizontal surface like a table top and is sized to prevent said display member from toppling over when a compact disc is attached to same.

It is a further object to have a compact disc securing means attached to said display member that releasably secures to a center hole in the compact disc.

It is a further object to have said compact disc securing means having an array of teeth that releasably secures to the center hole in the compact disc.

It is a further object to have a Compact Disc Display Device that releasably secures multiple compact discs.

It is a further object to have a Compact Disc Display Device having indicia attached to either side of said display member.

The invention itself, together with further objects and attendant advantages, will best be understood by reference to the following detailed description, taken in conjunction with the accompanying drawings.

DESCRIPTION OF THE PREFERRED EMBODIMENT

Figure 1:
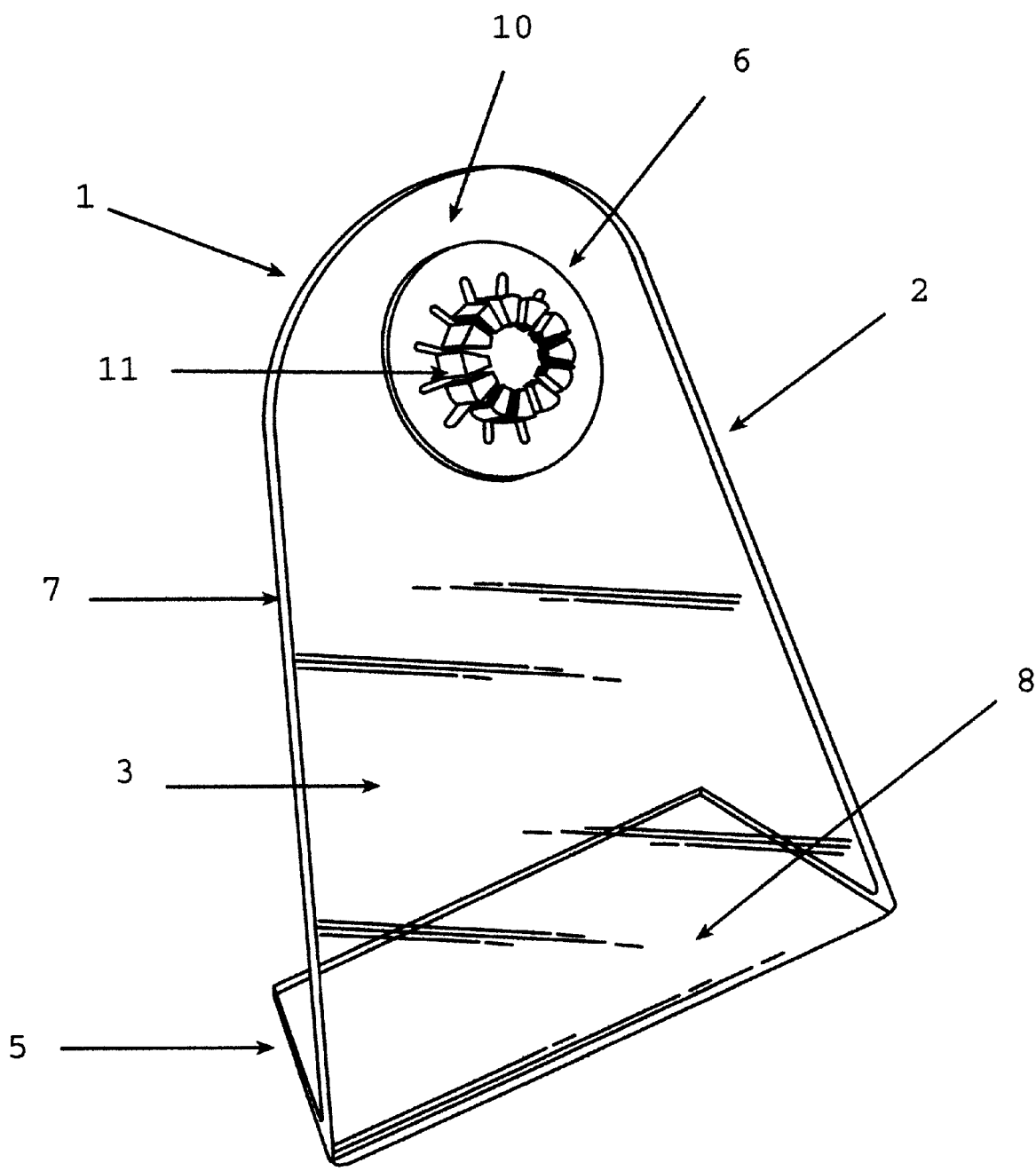
FIG. 1 is a front perspective view of the Compact Disc Display Device.
Figure 2:
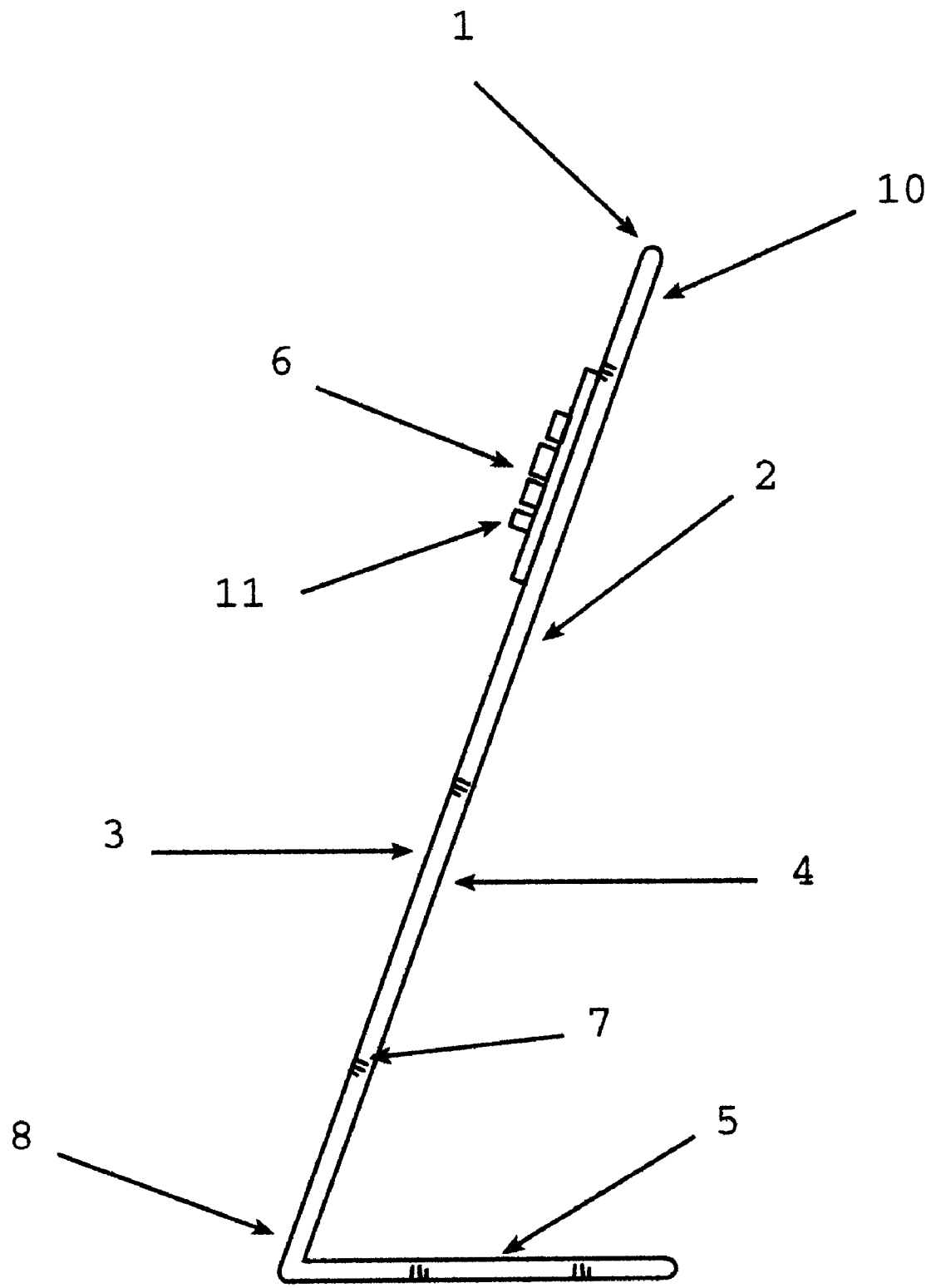
FIG. 2 is a side view of a Compact Disc Display Device as seen from the right-hand side which incorporates a presently preferred embodiment of this invention.

FIG. 1 and FIG. 2 shows a front perspective view of the Compact Disc Display Device 1 and a right-hand side view of the Compact Disc Display Device 1 respectively. Said Compact Disc Display Device 1 is comprised of a display member 2 having a face portion 3 and a rear portion 4, a base member 5, and a compact disc securing means 6. The device 1 can by made from a myriad of materials, including but not limited to plastic, crystal styrene, acrylic, metal, and glass.

As illustrated in FIG. 2, said face portion 3 and said rear portion 4 form opposite each other, both joined adjacently by edge 7. The display member 2 can be either adjacently attached or adjacently configured at its lower end 8 to base member 5. Base member 5 is designed to rest on any horizontal surface like a table top or a shelf. The display member 2 can be set at an angle of, but not limited to, seventy degrees from horizontal zero degrees relative to the base member 5. It is essential that base member 5 is sized to prevent angled display member 2 from toppling over when a compact disc 9 is attached to securing means 6 as shown in FIG. 3.

Figure 4:
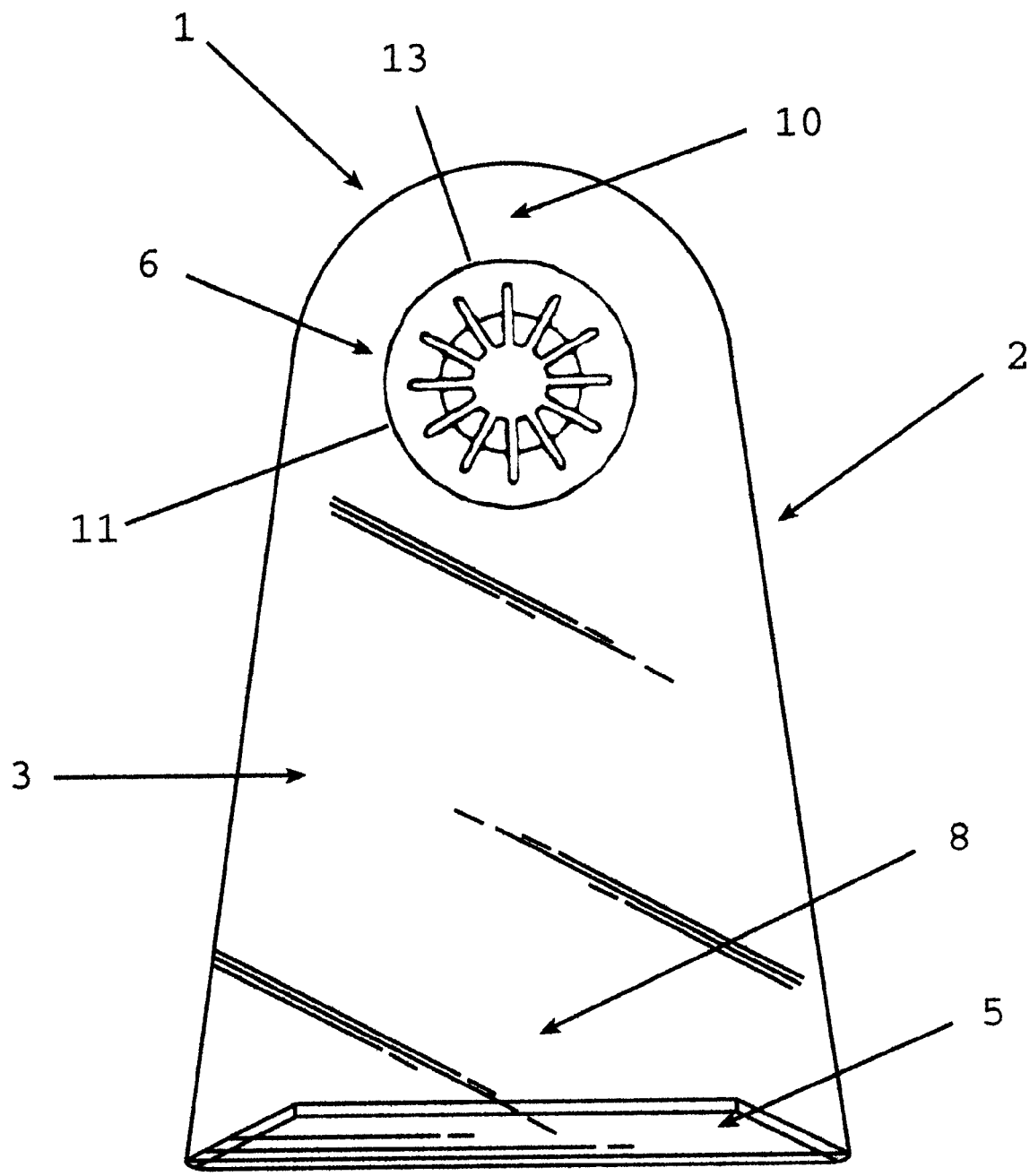
FIG. 4 is a front view of the compact disc display device.

FIG. 4 shows a front view of the Compact Disc Display Device 1. The upper end 10 of display member 2 has a width sized to accommodate securing means 6.

Figure 5:
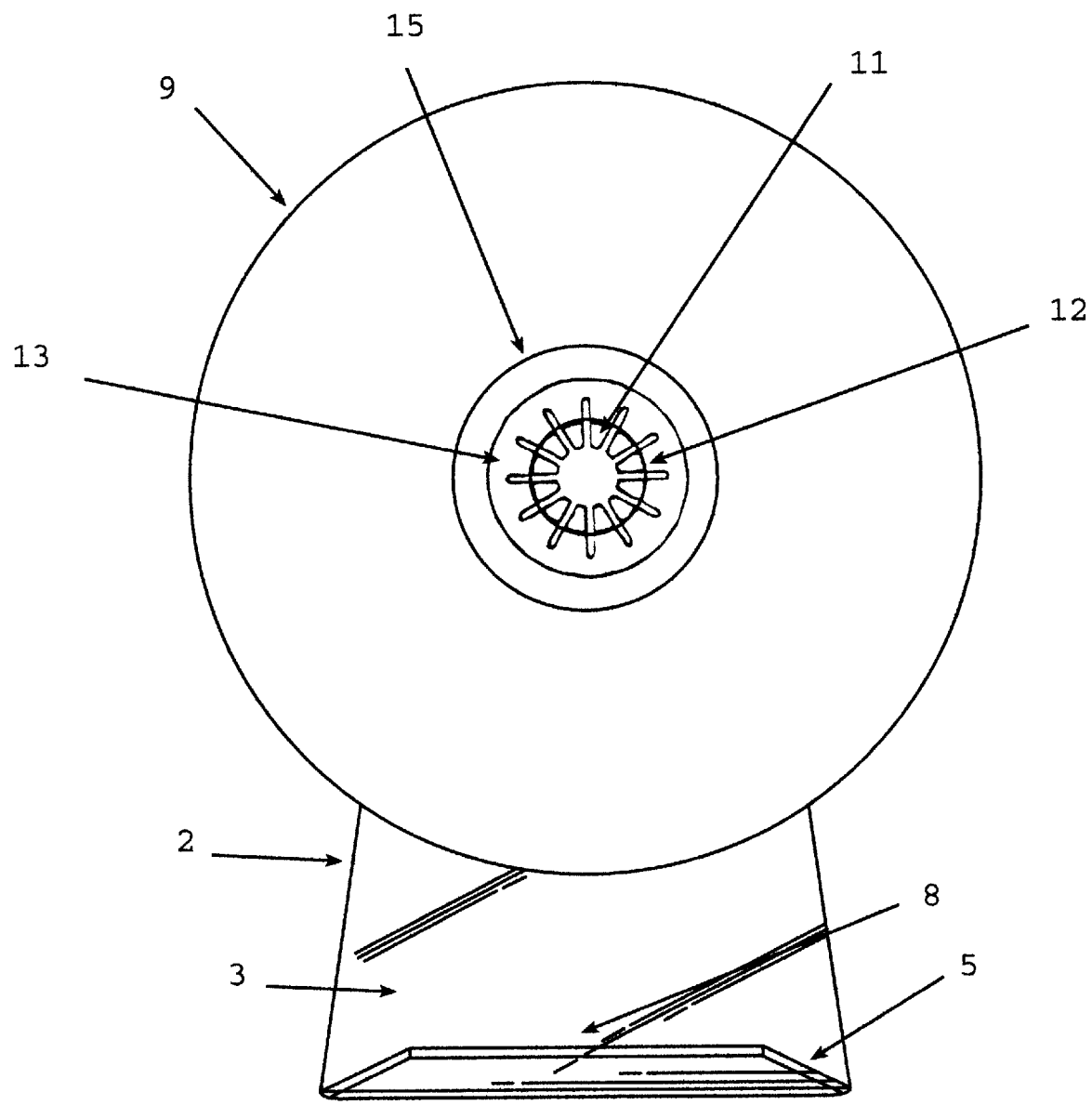
FIG. 5 is a front view of the Compact Disc Display Device showing an attached compact disc.
Figure 6:
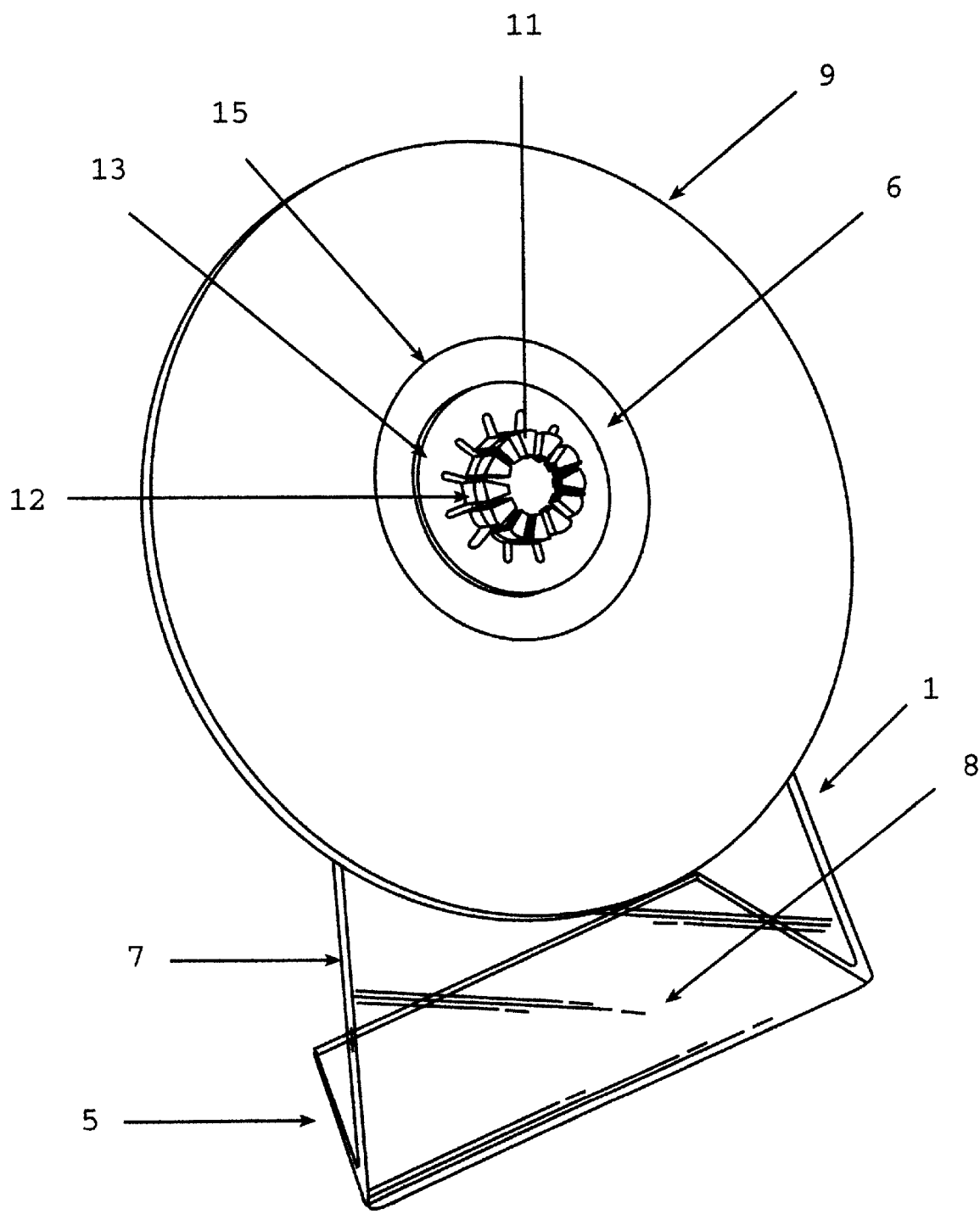
FIG. 6 is a front perspective view of the Compact Disc Display Device showing an attached compact disc.

FIG. 5 is a front view of the Compact Disc Display Device 1 showing an attached compact disc 9 according to the object of the present invention. The lower end 8 of display member 2 should have a width sized to accommodate the weight of the compact disc 9. FIG. 6 shows a front perspective view of the Compact Disc Display Device 1 also showing an attached compact disc 9 to the compact disc securing means 6. For use with the preferred embodiment of the present invention, the compact disc securing means 6 can be any design that releasably secures a compact disc 9. The most important feature with any compact disc securing means 6 is that it is sized to receive and releasably secure the center hole 12 of the compact disc 9. The compact disc securing means 6 employs required friction to the center hole 12 of the compact disc 9 allowing it to be releasably secured into place. Examples of such compact disc securing means 6 are a plurality of flexible teeth 11 or a round bubble hub (not shown).

Figure 3:
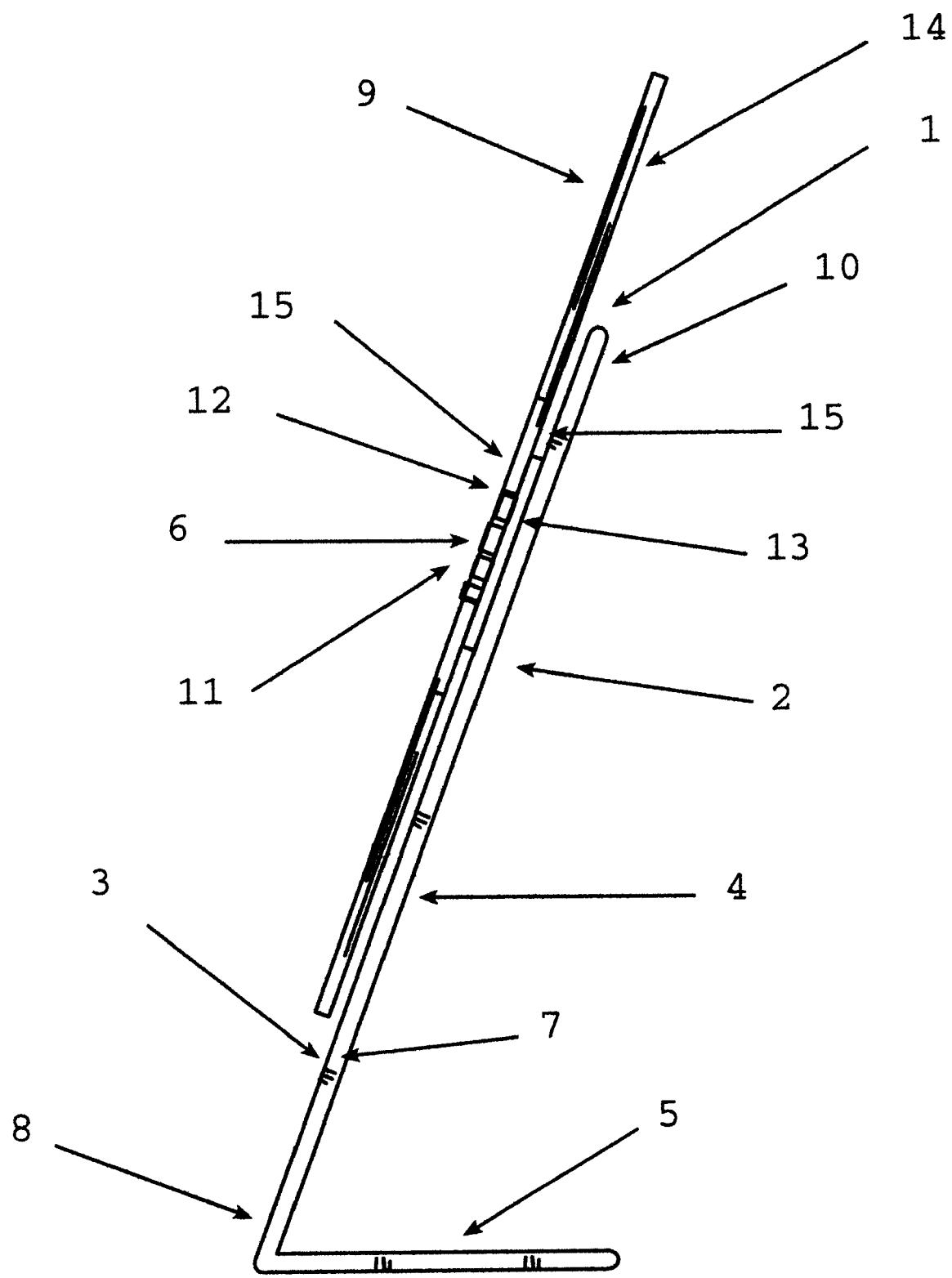
FIG. 3 is a side view of the Compact Disc Display Device as seen from the right-hand side showing an attached compact disc.

As shown in FIG. 3, the Compact Disc Display Device 1 can also have a stacking ring ledge 13 attached to the upper end 10 of display member 2 and surrounding said compact disc securing means 6, and recessed from said compact disc securing means 6. The ledge 13 prevents the read side 14 of the compact disc 9 from coming into contact with the face portion 3 of the device 1, and possibly scratching the disc 9. As FIG. 3 further illustrates, the stacking ring 15 is the only portion of the compact disc 9 that touches the device 1 at the stacking ring ledge 13, preventing the read side 14 from touching the face portion 3.

Figure 7:
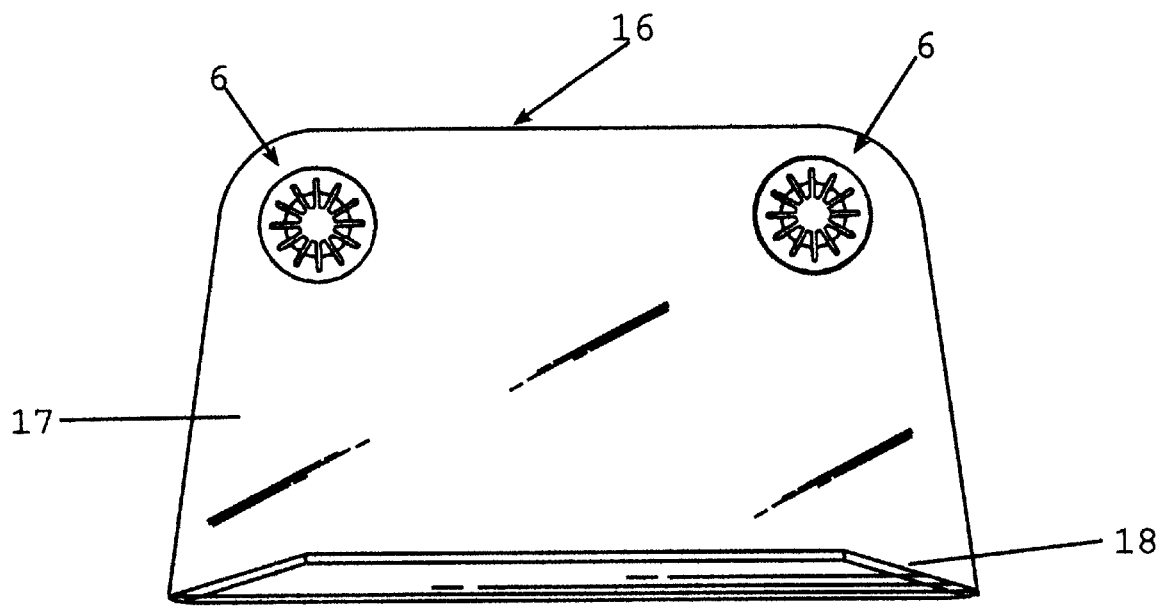
FIG. 7 is a front view of the Compact Disc Display Device With multiple compact disc attaching means.
Figure 8:
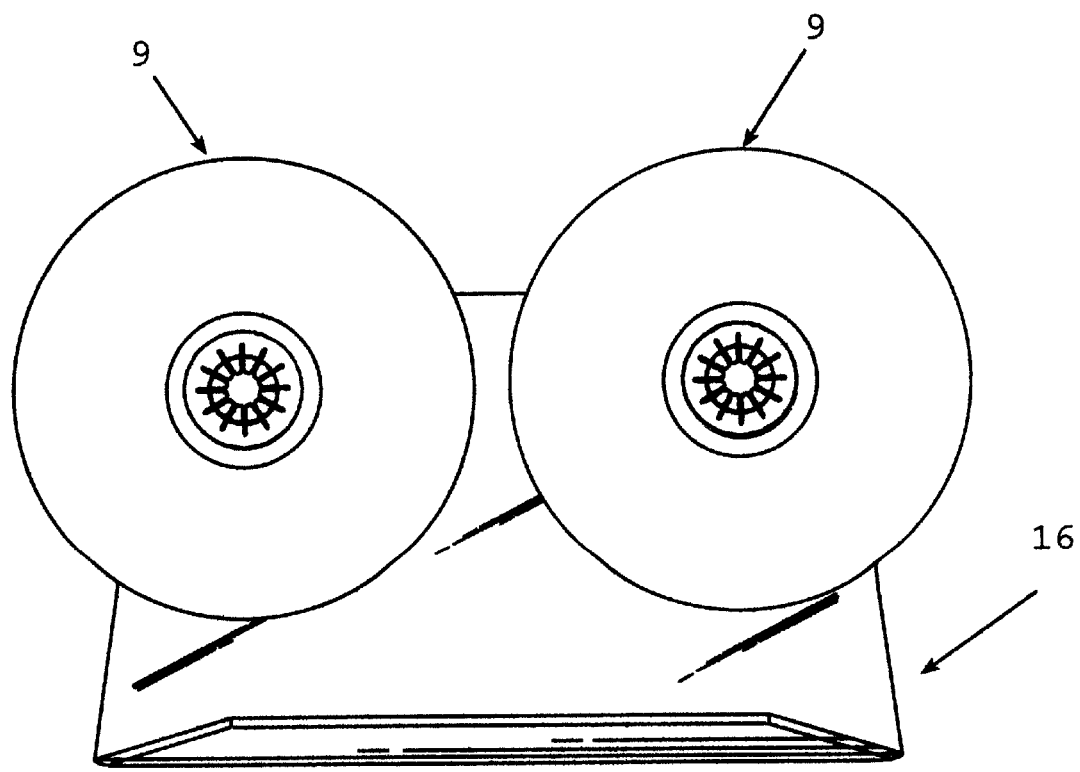
FIG. 8 is a front view of the Compact Disc Display Device showing multiple compact disc attaching means with multiple compact discs attached.
Figure 9:
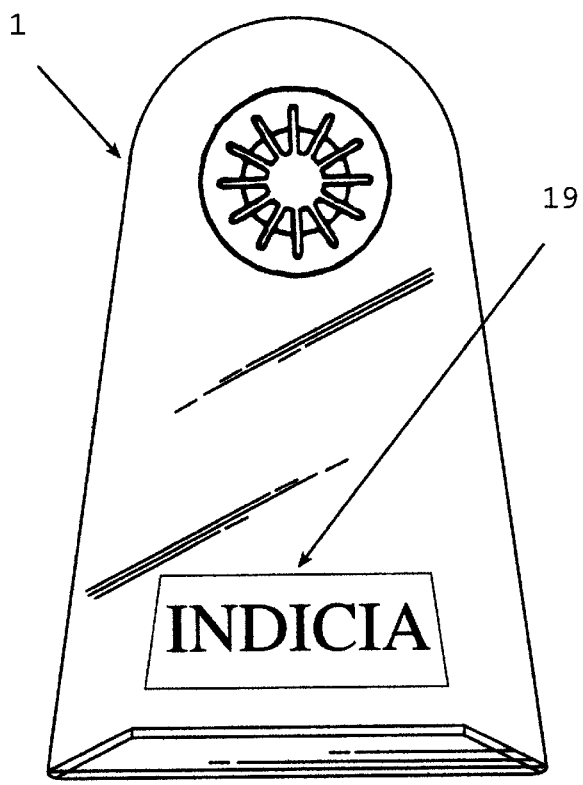
FIG. 9 is a front view of the Compact Disc Display Device showing indicia attached.
Figure 10:
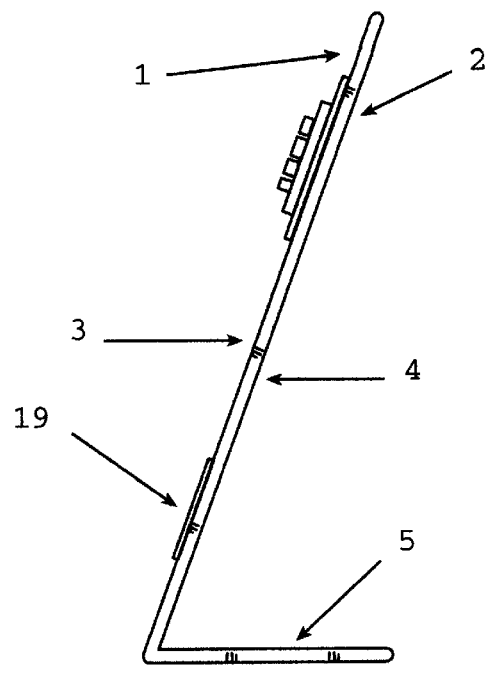
FIG. 10 is a side view of the Compact Disc Display Device as seen from the right-hand side showing the indicia attached to the face portion.
Figure 11:
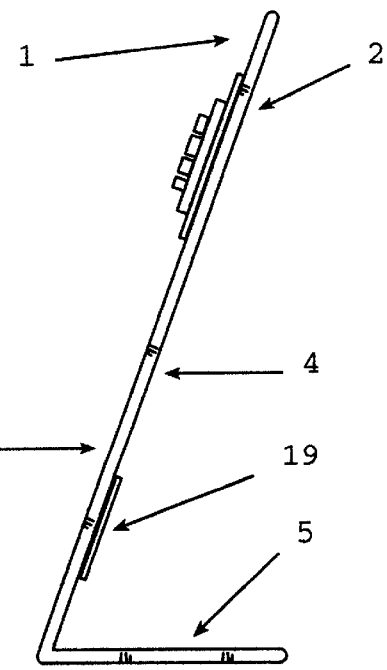
FIG. 11 is a side view of the Compact Disc Display Device as seen from the right-hand side showing the indicia attached to the rear portion.
Figure 12:
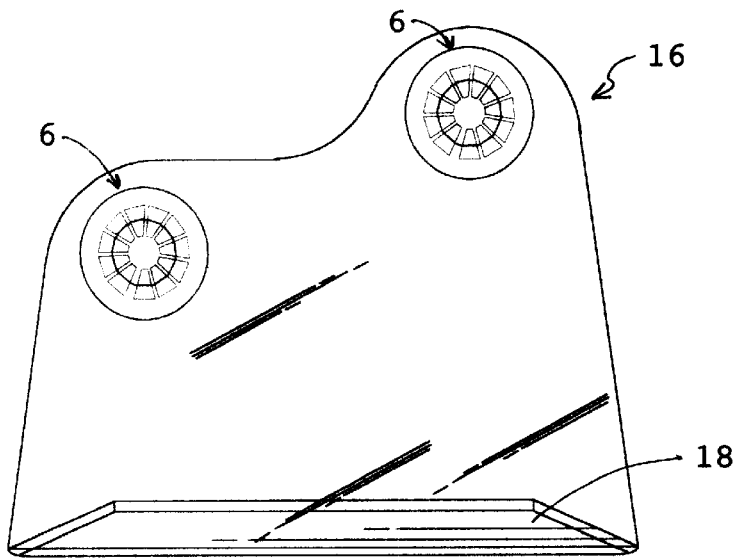
FIG. 12 is a front view of the Compact Disc Display Device showing an alternative design with a plurality of attaching means.
Figure 13:
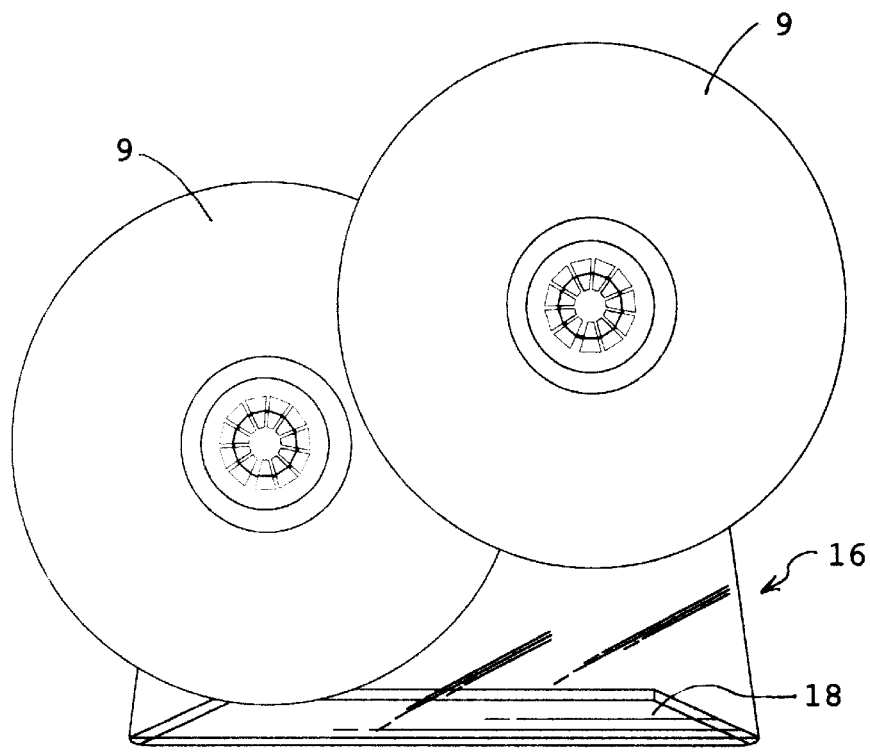
FIG. 13 is a front view of the Compact Disc Display Device showing an alternative design with a plurality of attaching means having compact discs attached.

The present invention is not limited to decoratively displaying one compact disc 9, but can also hold a plurality of compact discs 9 as well. FIG. 7 shows a front view of a Compact Disc Display Device 16 with multiple compact disc attaching means 6. The construction of said device is the same as Compact Disc Display Device 1 except that the display member 17 is sized to allow multiple compact discs 9 to be attached onto the device 16. A plurality of compact disc securing means 6 is attached to the display member 17 in the same manner as device 1. As such, the device 16 requires a base member 18 to be sized to accommodate a comparable amount of compact discs 9 as are attached to compact disc securing means 6. FIG. 8 is a front view of the Compact Disc Display Device 16 showing a plurality of compact discs 9 attached according to the object of the present invention. FIG. 12 shows an alternate design of the Compact Disc Display Device 16 with a plurality of attaching means 6. FIG. 13 shows an alternate design of the Compact Disc Display Device 16 with a plurality of attaching means 6 having compact discs 9 attached. Indicia can also be applied to either display device 1 or 16 for identification or for decorative purposes. FIG. 9 shows a front view of a Compact Disc Display Device 1 having indicia 19 attached. Generally, the indicia 19 will be attached at the lower end 8 of face portion 3 of display member 2. Indicia 19, however, can be attached to a portion of, or, the entire display member 2 (not shown). FIG. 10 shows a side view of display device 1 as seen from the right-hand side with the indicia 19 attached to the face portion 3. The indicia 19, however, can also be attached to the rear portion 4 of the display member 2 as an alternative placement. FIG. 11 shows a side view of the Compact Disc Display Device 1 as seen from the right-hand side with the indicia 19 attached to the rear portion 4 of display member 2.

I claim:

1. A compact disc display device comprising:
   a. a display member for decoratively displaying a compact disc having a face portion and a rear portion where said face portion is positioned opposite said rear portion and adjacently joined by an edge, said display member is fixed in an upward, non-perpendicular non-flexible angular relationship with a base member where said base member rests on any horizontal surface and is sized to prevent said display member from toppling over when a compact disc is attached to said display member; and
   b. a compact disc securing means attached to the face portion of said display member that releasably secures to a center hole in the compact disc.

2. A compact disc display device as described in claim 1 wherein:
   said compact disc securing means having a plurality of teeth that releasably secures to the center hole in the compact disc.

3. A compact disc display device as described in claim 2 also comprising:
   a stacking ring ledge attached to the face portion of said display member surrounding said compact disc securing means and recessed from said compact disc securing means.

4. A compact disc display device as described in either claim 1 or 3 further comprising:
   a plurality of compact disc securing means attached to the face portion of said display member sized to accommodate said plurality of securing means that releasably secures to a plurality of center holes in an equivalent plurality of compact discs.

* * * * *